(12) United States Patent
Bohn

(10) Patent No.: US 6,247,723 B1
(45) Date of Patent: Jun. 19, 2001

(54) DEVICE FOR ACTUATING AN ELECTRICAL CONTACTOR

(75) Inventor: Stefan Bohn, Goldbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/335,541

(22) Filed: Jun. 18, 1999

(30) Foreign Application Priority Data

Jun. 19, 1998 (DE) .......................................... 298 11 043 U

(51) Int. Cl.[7] .................................................. B60R 21/16
(52) U.S. Cl. .......................................... 280/731; 200/61.54
(58) Field of Search ................................ 280/731, 728.3; 200/61.54

(56) References Cited

U.S. PATENT DOCUMENTS

| | | | | |
|---|---|---|---|---|
| 5,062,661 | * | 11/1991 | Winget | 280/731 |
| 5,338,906 | * | 8/1994 | Yokota | 200/61.54 |
| 5,871,234 | * | 2/1999 | Umemura et al. | 280/731 |
| 6,062,592 | * | 5/2000 | Sakurai et al. | 280/728.2 |

* cited by examiner

*Primary Examiner*—Douglas Hess
*Assistant Examiner*—Lynda Jasmin
(74) *Attorney, Agent, or Firm*—Tarolli, Sundheim, Covell, Tummino & Szabo L.L.P.

(57) ABSTRACT

A horn switch on a vehicle includes an actuator (1) connected to the steering wheel via webs (2) resiliently deflectable transversely to said steering wheel axis. The actuator is normally spaced from a contact foil and, when actuated, urges on the contact foil to establish an electrical contact between opposed contact areas of the foil.

14 Claims, 1 Drawing Sheet

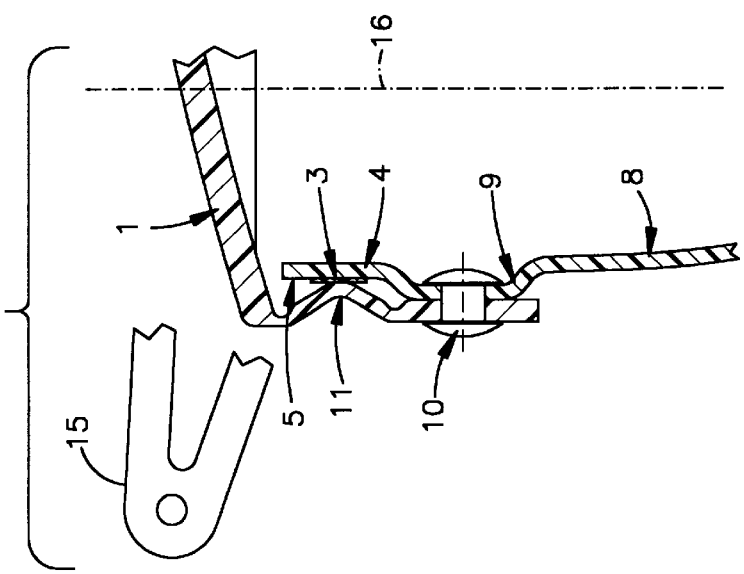
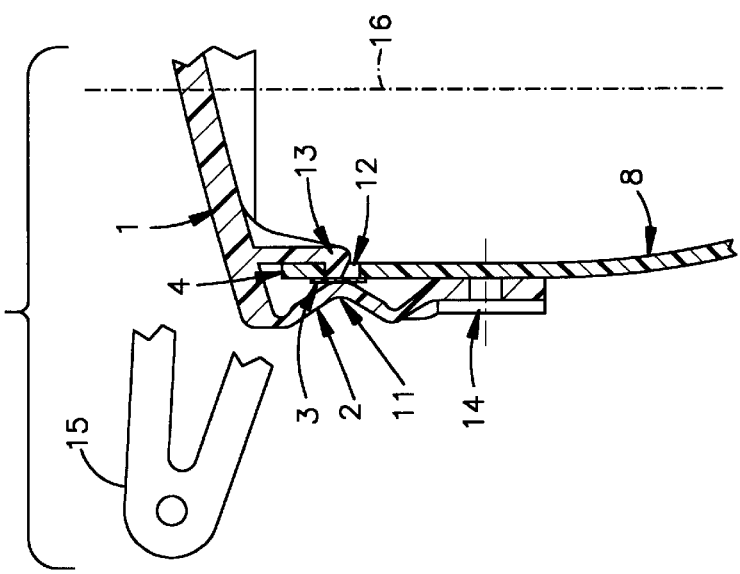
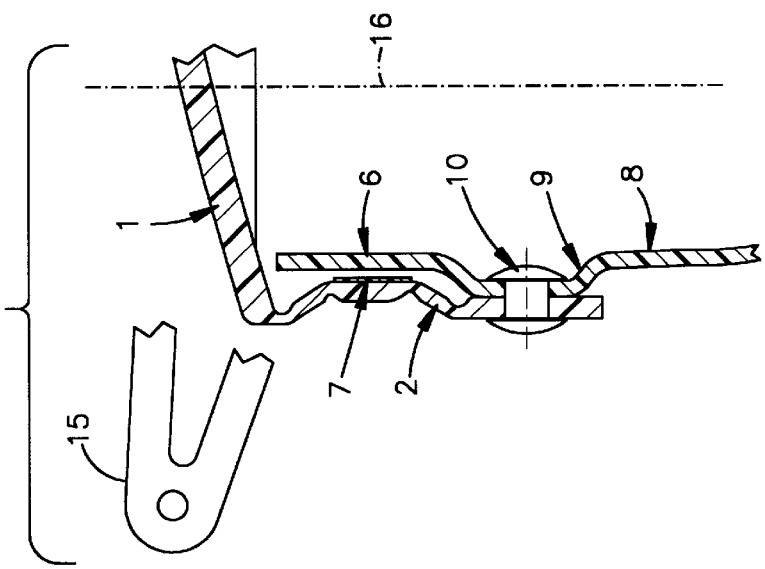

DEVICE FOR ACTUATING AN ELECTRICAL CONTACTOR

The present invention relates to a device for actuating an electrical contactor located on a vehicle steering wheel.

BACKGROUND OF THE INVENTION

Such actuating devices are arranged in vehicle steering wheels more particularly for actuating a horn switch so that they are readily accessible to the driver without having to let go of the steering wheel at all or only for a fleeting moment. They are typically configured as a kind of push-button switch, i.e. contact is established by pressure applied to an actuating portion which due to its resiliency is returned to its initial position as soon as the pressure is released. Such contactors are made use of not only for actuating a horn switch but also for a variety of other functions where it is important that handling the steering wheel is not impaired.

In steering wheels typically provided with an air bag module nowadays it is the cover cap of the air bag module that is often used as an actuator, the cover cap itself needing to satisfy a series of other functions, as a result of which its design configuration as an actuator is highly complicated.

It has been proposed to arrange a contact foil fixedly located between the folded air bag and the cover cap and to connect the cover cap to the steering wheel resiliently to such an extent that it can be pressed down as a whole, resulting in the desired contact also being produced even when the cover cap is pressed down on one side in an edge region. This automatically results in the contact foil also being ruined on activation of the air bag and entails that it needs to be configured and secured in place so that it The actuator for the contactor arranged in the steering wheel is moved typically in the direction of the steering wheel axis, the contact spacing to be maintained within tight limits being thus determined in the direction of the steering wheel axis. This poses a variety of difficulties in design, especially in the case of steering wheels equipped with an air bag module, because arranging and activating an air bag module often necessitates measures which run counter to an optimum arrangement of a contactor.

SUMMARY OF THE INVENTION

It is thus an object to provide a contactor the actuation of which is permitted in the usual way, the arrangement of which, however, can be easily isolated in design from the installation conditions for an air bag module so that no unnecessary design compromises need to be made for the various functions.

To achieve this the invention proposes that the actuator is connected to the steering wheel via webs resiliently deflectable transversely to the steering wheel axis in response to axial pressure on the actuator.

This deflecting of the fastener means for the actuator transforms an axial actuating stroke into contact movement transversely to the steering wheel axis, such movement occurring outside of the space required for installing an air bag module. The deflectable fastener means in accordance with the invention may also be configured so that the restoring forces needed for the actuator and for opening the contacts can be produced without resort to separate biasing means.

BRIEF DESCRIPTION OF THE DRAWINGS

Further details will now be detained with reference to the example embodiments depicted in the FIGS. 1 to 3, in which:

FIG. 1 is a vertical section through the air bag portion of a steering wheel.

FIG. 2 is a vertical partial section as shown in FIG. 1 for a second embodiment

FIG. 3 is a vertical partial section as shown in FIG. 1 for a third embodiment

DESCRIPTION OF PREFERRED EMBODIMENTS

Referring now to FIG. 1 there is illustrated an example embodiment in which the cover cap 1 is connected by means of to an inflator mount 8 of the air bag module. The inflator mount 8 is configured pot-shaped with a rim 9 oriented roughly parallel to the steering wheel axis, a cylindrical surface area 5 arranged concentrically to the steering wheel axis 16, of the vehicle steering wheel 15 serving as the contact mount 4. The webs 2 of the cover cap 1 are connected to the rim 9 of the inflator mount 8, here rivets 10, screws or the like may be used for this purpose. Applied either circumferentially or section-wise to a circumferential portion of the cylindrical surface area 5 of the contact mount 4 is a contact foil 3 by means of which the necessary contact is produced as long as a sufficient pressure is applied. In this arrangement the part of the actuator requiring to apply the pressure hardly needs to travel any actuation path at all, the important thing being that at least a minimum necessary pressure is exerted. In the embodiment as shown in FIG. 1 the webs 2 are provided with a deflect location 11 in contact with the contact foil 3 or slightly spaced away therefrom in the starting position. When pressure is applied to the cover cap 1 the webs 2 deflect inwardly transversely to the steering wheel axis resulting in the necessary pressure being applied to the contact foil 3. Instead of single webs 2 a circumferentially or section-wise arranged bellows-type fastener may also be provided.

Referring now to FIG. 2 there is illustrated an embodiment which differs from that as shown in FIG. 1 merely by the way in which the cover cap 1 is secured. Provided on the inflator mount 8 are straps 14 into which the webs 2 of the cover cap 1 can be inserted. In addition the cover cap 1 comprises clips 13 oriented inwardly for engaging the recesses 12 in the inflator mount 8 on assembly. The same as in the example embodiment as shown in FIG. 1 the contact foil 3 is applied to a cylindrical surface area 5 of the contact mount 4 concentrically to the steering wheel axis. The webs 2 have deflection locations 11 which are pressed against the contact foil when pressure is applied to the cover cap 1 transversely to the steering wheel axis.

Referring now to the embodiment as shown in FIG. 3 several fixed contact tongues 6 are provided applied to or configured at the upper end of the rim 9 of the inflator mount 8 running parallel to the steering wheel axis 16. Second resiliently deflectable contact tongues 7 are applied to the webs 2 of the cover cap 1 running parallel to the steering wheel axis 16 or to a bellows-type fastener arranged circumferentially or section-wise running parallel to the steering wheel axis 16. The webs 2 may be secured to the inflator mount 8 the same as in the example embodiment as shown in FIG. 1. The second tongues 7 can be pressed against the first contact tongues 6 via the webs 2. Alternatively, a plurality of pairs of contact tongues 6, 7 can be distributed circumferentially in an area concentric to the steering wheel axis.

Making the contact by means of webs or the like deflectable transversely to the steering wheel axis opens up a series of possibilities of isolating the design of the contacting and air bag functions whilst also permitting a highly compact arrangement of the contractor means.

It should be noted that the deflectable webs can be conveniently formed by a bellows-type structure.

What is claimed is:

1. A device comprising an electrical contactor on a vehicle steering wheel and an actuator arranged to be movable to a limited degree relative to said steering wheel in a direction corresponding to a steering wheel axis against a return bias, said actuator being connected to a component of said steering wheel via webs reversibly and resiliently deflectable transversely to said steering wheel axis in response to axial pressure acting on said actuator, said webs in the deflected state actuating said contactor, thereby providing an electrical contact.

2. The device as set forth in claim 1, wherein said actuator is formed by a cover cap for an air bag module accommodated in said steering wheel.

3. A device comprising an electrical actuator on a vehicle steering wheel arranged to be movable to a limited degree relative to said steering wheel in a direction corresponding to a steering wheel axis against a return bias, said actuator being connected to a component of said steering wheel via webs resiliently deflectable transversely to said steering wheel axis in response to axial pressure acting on said actuator, said actuator being a pressure-sensitive contact foil, said contact foil being arranged on a contact mount extending in the direction of said steering wheel axis.

4. A device comprising an electrical actuator on a vehicle steering wheel arranged to be movable to a limited degree relative to said steering wheel in a direction corresponding to a steering wheel axis against a return bias, said actuator being connected to a component of said steering wheel via webs resiliently deflectable transversely to said steering wheel axis in response to axial pressure acting on said actuator, said actuator including a contact mount extending in the direction of said steering wheel axis, said contact mount comprising a cylindrical surface area arranged concentric to said steering wheel axis, and including a circumferential contact foil strip applied to a circumferential portion of said cylindrical surface area.

5. A device comprising an electrical actuator on a vehicle steering wheel arranged to be movable to a limited degree relative to said steering wheel in a direction corresponding to a steering wheel axis against a return bias, said actuator being connected to a component of said steering wheel via webs resiliently deflectable transversely to said steering wheel axis in response to axial pressure acting on said actuator, said actuator including a contact mount extending in the direction of said steering wheel axis, said contact mount comprising a cylindrical surface area arranged concentric to said steering wheel axis, and strip sections of said contact foil applied to a circumferential portion of said cylindrical surface area.

6. A device comprising an electrical actuator on a vehicle steering wheel arranged to be movable to a limited degree relative to said steering wheel in a direction corresponding to a steering wheel axis against a return bias, said actuator being connected to a component of said steering wheel via webs resiliently deflectable transversely to said steering wheel axis in response to axial pressure acting on said actuator, said contactor having at least one first fixed contact tongue and at least one second resiliently deflectable contact tongue which can be pressed against said first contact tongue by means of said web transverse to said steering wheel axis.

7. The device as set forth in claim 6, wherein said contact tongues extend substantially in the direction of said steering wheel axis.

8. The device as set forth in claim 6, wherein a plurality of pairs of contact tongues are distributed circumferentially in an area concentrical to said steering wheel axis.

9. A device comprising an electrical actuator on a vehicle steering wheel arranged to be movable to a limited degree relative to said steering wheel in a direction corresponding to a steering wheel axis against a return bias, said actuator being connected to a component of said steering wheel via webs resiliently deflectable transversely to said steering wheel axis in response to axial pressure acting on said actuator, said actuator being formed by a cover cap for an air bag module accommodated in said steering wheel, and an inflator mount being fixedly connected to said steering wheel, said mount being generally pot-shaped with a rim extending substantially parallel to said steering wheel axis, said cover cap being connected to said rim via said deflectable webs.

10. The device as set forth in claim 9, wherein a contact foil is arranged at said rim of said inflator mount above a fastener location for said webs.

11. The device as set forth in claim 10, wherein said webs each have a deflection point radially opposite said contact foil.

12. The device as set forth in claim 9, wherein said first contact tongues are arranged on said circumferential rim of said inflator mount and said second contact tongues are arranged at deflection locations of said webs.

13. The device as set forth in claim 12, wherein said deflection locations of said webs are further configured as predetermined breaking areas.

14. The device as set forth in claim 12, wherein said webs are connected to said rim of said inflator mount by means of clips engaging recesses in said inflator mount, and which clips release on activation of said air bag.

* * * * *